US005554921A

United States Patent [19]
Li et al.

[11] Patent Number: 5,554,921
[45] Date of Patent: Sep. 10, 1996

[54] BATTERY CHARGER APPARATUS AND METHOD WITH MULTIPLE RANGE CURRENT CONTROL

[75] Inventors: Edward Li, Roselle; Ralph M. Mitchell, Elgin; John H. Aseltine, Buffalo Grove, all of Ill.

[73] Assignee: Motorola, Inc., Schaumburg, Ill.

[21] Appl. No.: 172,307

[22] Filed: Dec. 23, 1993

[51] Int. Cl.⁶ .................. H01M 10/46; H01M 10/44; H02J 7/04
[52] U.S. Cl. .................................... 320/22; 320/39
[58] Field of Search .................. 320/12, 22, 23, 320/24, 27, 30, 39

[56] References Cited

U.S. PATENT DOCUMENTS

| | | | |
|---|---|---|---|
| 4,433,277 | 2/1984 | Carollo et al. | 320/24 |
| 4,835,453 | 5/1989 | Schmidt et al. | 320/13 |
| 4,924,169 | 5/1990 | Shifflet et al. | 320/39 |
| 5,192,905 | 3/1993 | Karlin et al. | 320/39 |
| 5,204,611 | 4/1993 | Nor et al. | 320/39 |

Primary Examiner—Peter S. Wong
Assistant Examiner—Patrick Law
Attorney, Agent, or Firm—Nicholas C. Hopman

[57] ABSTRACT

An improved battery charger apparatus and method with multiple range current control includes a programmable current source (101) for providing a charge current (105) to charge a battery (107). An amplitude of the charge current (105) is dependent on a charge demand signal (117) supplied to the programmable current source (101). A scaler (109) provides a scaled charge current signal (111), dependent on the charge current (105) and a current range signal (113). A charge current control unit (115) regulates the charge current (105) by providing the charge demand signal (117) to the programmable current source (101) dependent on the scaled charge current signal (111). More than one amplitude of the charge current (105) is provided to the battery (107), dependent on more than one current range signal (113) provided by the charge current control unit (115) to the scaler (109). Moreover, a constant amplitude of the scaled charge current signal (111) is maintained responsive to the more than one current range signal (113).

16 Claims, 2 Drawing Sheets

BATTERY CHARGER APPARATUS AND METHOD WITH MULTIPLE RANGE CURRENT CONTROL

FIELD OF THE INVENTION

This invention is generally directed to the field of battery chargers, and specifically for variable charge rate battery chargers.

BACKGROUND OF THE INVENTION

Contemporary battery charger systems often have provision for a variable charge rate that is selected depending on the charge state of a battery. Often, these battery chargers pro, vide a current to the battery at a high rate until the battery is mostly charged, and then provide another current at a low rate to top-off the charge. Typically, these rates are fixed and are not programmable.

With the continuous development of new battery technologies, methods for charging these batteries must also evolve to stay effective. A particularly important aspect of effectively charging a battery is not to exceed its maximum charging voltage and over-charge specifications. It is also important to ensure the maximum battery temperature is not exceeded during charging. The maximum charging voltage limit is the maximum threshold voltage at a battery's terminals. The over-charge specification can be defined in terms of the ratio of the total input charging energy to its battery capacity. In order not to exceed these specifications, it is advantageous for a battery charger to differentiate the type of battery being charged. Then, optimize its charging rates for that type of battery. For instance, Lithium batteries are particularly sensitive to threshold voltage during charging. If the threshold voltage is exceeded, it could cause the internal pressure of the battery to rise rapidly and eventually cause the battery to explode, which is a real safety hazard. Also, if a batten is charged exceeding its overcharging specification, then the useful cycle life as well as battery capacity can be reduced. Because of these adverse effects, devices used to charge batteries must not exceed these limits while quickly charging the battery.

As battery technologies evolve and the expectations of longer charging cycle life increase, these specifications continue to get increasingly intolerant. For example, with NICAD battery technology, the over-charge specification may be 120% of capacity. With newer Lithium based technologies, an over-charge above 100% of capacity is not recommended must be avoided. This requires a more resolute and higher accuracy charging system to efficiently charge these batteries.

Beneficially, newer battery technologies are emerging with a capability of providing a charge personality. This personality can be used by the charger to more efficiently charge these batteries. Now, the accuracy and resolution of providing charge current over a wide range, perhaps several decades of currents, is becoming vital. Conventional charging systems do not have the capability to provide the required accuracy and resolution over several decades.

What is needed is an improved variable charge rate battery charger with multiple range current control, especially when a variety of batteries are used with the sine charger. This apparatus must include the capability to provide charge current that is more accurate and has higher resolution current control over multiple current ranges.

DETAILED DESCRIPTION OF A PREFERRED EMBODIMENT

An improved battery charger with multiple range current control includes a programmable current source for providing a charge current to charge a battery. An amplitude of the charge current is dependent on a charge demand signal applied to the programmable current source. A scaler provides a scaled charge current signal, which depends on the charge current and a current range signal. A charge current control unit regulates the charge current by providing the charge demand signal to the programmable current source dependent on the scaled charge current signal. More than one intensity of the charge current is provided to the battery dependent on more than one current range signal provided by the charge current control unit to the scaler. Moreover, a constant amplitude of the scaled charge current signal is maintained responsive to the more than one current range signal. Several important aspects of the invention will be better understood by referencing the provided illustrations.

Figure 1:
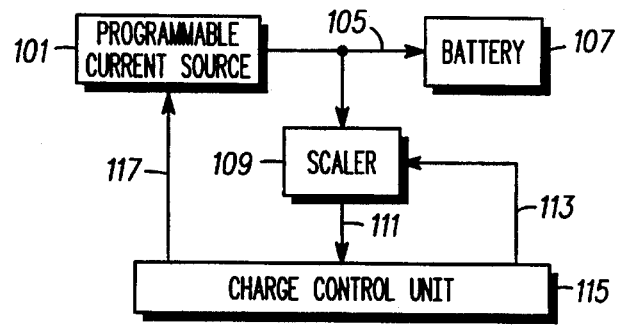
FIG. 1 is a system block diagram illustrating an improved battery charger apparatus in accordance with a preferred embodiment.

FIG. 1 is a system block diagram illustrating the improved battery charger apparatus. A programmable current source 101 provides a charge current 105 to a battery 107, in response to a charge demand signal 117. The charge current 105 is scaled by a scaler 109, depending on a current range signal 113 provided by current range selection circuit, or a charge current control unit 115. The scaler 109 in turn provides a scaled charge current signal 111 to the charge current control unit 115. The charge current control unit 115 regulates the charge current 105 by providing the charge demand signal 117 to a control input 103 of the programmable current source 101 dependent on the scaled charge current signal 111. More than one amplitude of the charge current 105 is provided to the battery 107, dependent on more than one current range signal 113 provided by the charge current control unit 115 to the scaler 109. Typically, these ranges may include a fast charge current and a slow, or trickle, charge current for topping off a fast charged battery. Optionally, other ranges may be selected dependent on a particular battery's charge profile.

A distinct advantage in the above-described structure is that the charge current 105 can be controlled very accurately over multiple ranges. This, as described in the Background section, is vital in order to efficiently charge certain batteries. In-effect the charge current 105 is provided from the programmable current source to the battery 107 controlled by the charge control unit 115. The charge control unit 115 does this by first understanding the required battery charge profile, and a charge condition of the battery 107. Then the charge control unit 115 selects a range of charge current via an appropriate current range signal 113, and more finely controls the provided charge current 105 via the charge demand signal 117. This enables very accurate provision of the charge current 105 over different ranges. Next, FIG. 2 will be introduced.

Figure 2:
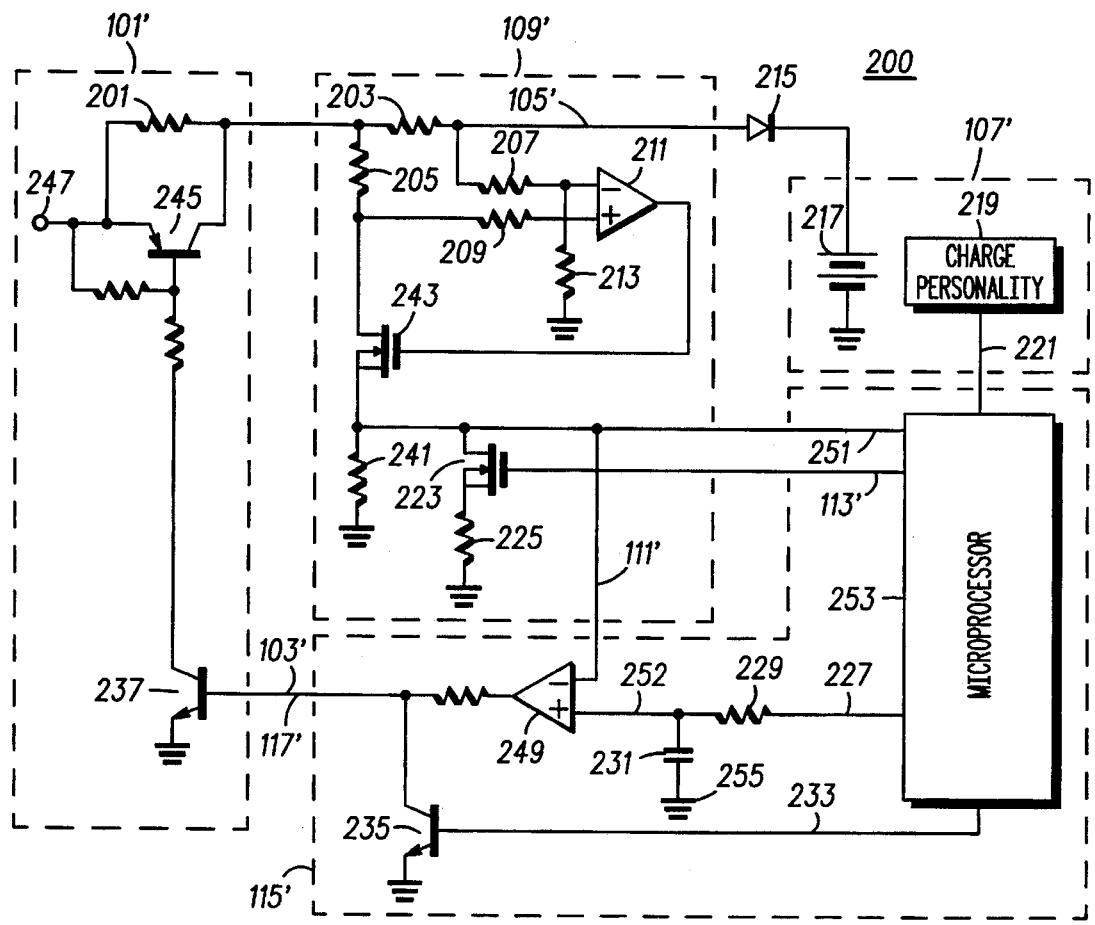
FIG. 2 is a schematic block diagram showing implementation details described in the preferred embodiment.

In FIG. 2 a schematic block diagram shows implementation details of the circuit represented in FIG. 1. Next, the details of the components introduced in FIG. 1 will be expanded in FIG. 2.

The programmable source 101 of FIG. 1 is represented by reference number 101' in FIG. 2, and comprises a pass transistor 245, a resistor 201, and a drive transistor 237. The pass transistor 245 passes current from a power supply terminal 247, to an output 202, dependent on a drive current provided to the transistor's 245 base junction. The passed current becomes the charge current 105', which is synonymous with the charge current 105 described in reference to FIG. 1. The drive current provided to the transistor's 245 base junction is dependent on the action of the drive transistor 237, Which in turn is dependent on a signal applied to its base terminal. The base terminal of the drive transistor 237 is coupled to a control input 103', which is synonymous with the control input 103 of FIG. 1. A charge demand signal 117', synonymous with the charge demand signal 117 introduced in FIG. 1, is input to the base terminal of the drive transistor 237. Therefore, the charge current 105' is dependent on the charge demand signal 117'.

The scaler 109 of FIG. 1 is represented by the circuit embodied within an area labeled by reference 109' in FIG. 2. The purpose of this scaler 109', is to measure an amplitude of charge current 105' provided to a rechargeable battery 217. The output of the scaler 109' is a scaled charge current signal 111', synonymous with the scaled charge current signal 111 shown in FIG. 1. Here, the scaled charge current signal 111' is represented by a voltage whose level is dependent on the amplitude of charge current 105', and a current range signal 113'. The current range signal 113', is synonymous with the a current range signal 113 discussed in reference to FIG. 1. In this application, the charge current 105' could span over several decades. By controlling the scaler's 109' gain with the current range signal 113', a voltage level of the scaled charge current signal 111' can be forced to be the same regardless of the range the charge current 105'. In other words, through the action of the control loop formed by the programmable current source 101', the scaler 109', and the charge current control unit 115', a constant amplitude of the scaled charge current signal 111' is maintained responsive to the more than one current range signal 113'. That the voltage level of scaled charge current signal 111' can be forced to be the same regardless of the range the charge current 105' is key, and a working example will be detailed below, after the introduction of the details of the system 200. Gain of the scaler 109' is controlled by the current range signal 113' provided from the microcontroller 253. In this example, only high and low ranges are described. Further operation of the scaler 109', and associated circuitry, is described as follows.

Resistor 203 is a sense resistor. A differential voltage is induced across resistor 203 when the charge current 105' is flowing from the programmable current source 101' to the rechargeable battery 217. This differential voltage is representative of an amplitude of the charge current 105'. This differential voltage is electrically referenced to the high side of the rechargeable battery 217. Pertinently, as part of a charge current control unit 115', a charge current demand signal 227 provided by the microcontroller 253 is referenced to ground 255. This charge current demand signal 227, in-effect represents a fine current adjustment, as opposed to the coarse current adjustment effected by the earlier-described current range signal 113'. Note that the charge control unit 115' of FIG. 2 is synonymous with the charge control unit introduced in FIG. 1. In order for an error amplifier 249 to make use of the charge current demand signal 227 to control the charge current 105' through programmable current source 101', the differential voltage representation of charge current 105' must be translated to a ground 255 referenced voltage. Thereby, the scaled charge current signal 111' must be referenced to ground 255. An amplifier 211 controls a gate of a transistor 243 to close a feedback loop internal to the scaler 109'. Because of a relatively high gain of the amplifier 211, a voltage drop across resistor 205 will be forced to match the differential voltage induced across resistor 203. Therefore, the amplitude of current flowing through resistor 205 is equal to the ratio of the resistance's of resistor 203 to resistor 205 multiplied by the amplitude of the charge current 105'.

In this application, the resistance of resistor 205 is a few hundred times the resistance of resistor 203. Therefore, the current flowing through the resistor 205 is a few hundred times less than the charge current 105' flowing through resistor 203. The current flowing through the resistor 205 multiplied by the resistance of the resistor 241 or the parallel equivalent of resistors 241 and 225 will provide a ground referenced voltage indicative of the charge current 115'. This ground referenced voltage is the aforementioned scaled charge current signal 111'. The level, or amplitude, of this ground referenced voltage is dependent on the following operations.

When the aforementioned high charge current range is required, the current range signal 113' provided from microcontroller 253 will be a logical "one". The provision of a logical "one" current range signal 113' will cause the transistor 223 to turn on, or conduct. Then, the scaled charge current signal 111' will be dependent on a current flowing through resistor 205 multiplied by the parallel resistance of the resistors 241 and 225.

Conversely, when the aforementioned low charge current range is required, the current range signal 113' provided from microcontroller 253 will be a logical "zero". The provision of a logical "zero" current range signal 113' will cause the transistor 223 to turn off, thereby eliminating any influence of resistor 225. Then, the scaled charge current signal 111' will be dependent on a current flowing through resistor 205 multiplied by the resistance of resistor 241 only. When this low charge current range is selected, the current flowing through resistor 205 is lower than it previously was flowing through both resistors 241 and 225 when the high charge current range was selected. However, in this case, the resistance of resistor 241 is higher than the parallel combination of resistors 241 and 225.

Therefore, by controlling the scaler's 109' gain via the current range signal 113', the voltage level of scaled charge current signal 111' can be forced to be the same regardless of the range the charge current 105'. This advantageous because by applying this high-low selection to the scaler 109' allows coarse adjustment, or range selection of the charge current 105', while allowing the fine current adjustment via the charge current demand signal 227 provided by the microcontroller 253.

Since the microcontroller 253 is essentially a digital device, the ability to produce the fine current adjustment is limited by the resolution of the microcontroller. This in-effect is defined by the operating data size in bits. Using an 8 bit microcontroller allows for 256 states to represent the fine current adjustment. Batteries require more resolute charge current levels than those providable using 256 states. Therefore, by adding the range selection function of the scaler 109' the system can resolve 256 states of fine current control in each of the selected ranges. This meets the demanding requirements of the battery's charging profile. Of course, given this teaching, one skilled in the art may expand this basic teaching to include more ranges, and more states of control.

Returning to the scaler 109', a voltage divider formed by resistors 207 and 213 adds an offset voltage at the negative input of the amplifier 211. By properly choosing the ratio of these resistors, this offset voltage can equal the worst case offset voltage inherent in the operational amplifier. This structure is used to eliminate the effect, or zero-out the inherent offset voltage of scaler 109'. The details of this auto-zeroing process will be discussed in a description of the nulling operation detailed later. Preferably, resistor 209 is chosen to equal to the value of the parallel resistance of resistors 207 and 213. By doing so, the offset voltage produced by the input bias current of the amplifier 211 can be effectively canceled out. Next the charge, control unit 115' portion of the system 200 will be further detailed.

The charge control unit 115' includes the error amplifier 249 that is used to close a control loop between the scaled charge current signal 111' and the control input 103' of the programmable current source 101'. The charge current 105', provided to the rechargeable battery 217, is dependent on the charge demand signal 117', which is dependent on the voltage level of scaled charge current signal 111', as discussed previously. Note that the charge demand signal 117' is synonymous with the charge demand signal 117 introduced in FIG. 1. The error amplifier 249 forces the voltage level of the scaled charge current signal 111' to be the same as a voltage 252. The voltage 252, is dependent on the earlier-mentioned fine current adjustment, or the charge current demand signal 227, provided by the microcontroller 253. The voltage 252 is provided to a positive input of the amplifier 249. By closing the control loop through the control input 103' of the programmable current source 101' and the scaler 109' the voltage level of the scaled charge current signal 111' will be forced to be the same as the voltage 252. Because of this control loop, the charge current 105' can be controlled by the voltage 252, representative of the charge current demand signal 227, provided to the positive input of the error amplifier 249.

As mentioned earlier, the charge current demand signal 227, provided by the microcontroller 253, is a pulse width modulated (PWM) signal representative of the fine current adjustment. The duty cycle of the PWM signal, the ratio of on-time and off-time, is controlled by the microcontroller 253. The PWM output of charge current demand signal 227 is translated to the voltage 252 by the integrator comprised of resistor 229 and capacitor 231. This voltage 252 is directly proportional to the duty cycle of the PWM of the charge current demand signal 227.

The error amplifier 249, and the attendant control loop, forces the scaled charge current signal 111' to be the same voltage as the voltage 252. Therefore, by varying the PWM duty cycle of the charge current demand signal 227, or by switching ranges via the current range signal 113', the amplitude, of the charge current 105' can be changed and maintained at a new amplitude. So that either when a new PWM charge current demand signal 227, or for that matter a current range signal 113', causes one of the inputs to the error amplifier 249 to change, the amplitude, of the charge current 105' will also change. After the control loop stabilizes the charge current 105' will also stabilize and be maintained, or regulated to the newly demanded amplitude. The control loop, comprised of the programmable current source 101', the scaler 109', and the charge current control unit 115' does this by forcing the scaled charge current signal 111 to transition to and be maintained at a constant amplitude based on either a new charge current demand signal 227, or a new range selected via the current range signal 113'. An advantage of using PWM for generating the voltage 252, is that only one input/output pin from the microcontroller 253 is required. Given this teaching, those skilled in the art will devise other means for providing the voltage 252. One method may use a parallel or serial D/A (digital-to-analog) converter. In this case, multiple input and/or output pins from the microcontroller 253 are required, and the conversion is more circuit intensive. The microcontroller 253 can also use a variable frequency output, its output can be converted to a voltage synonymous with the voltage 252 by using a frequency-to-voltage converter. The voltage 252 will then be directly proportional to the frequency generated by the microcontroller 253. All of these methods will produce an equivalent result. Next, further details of the charge control unit 115' associated Circuitry will be discussed.

Figure 3:
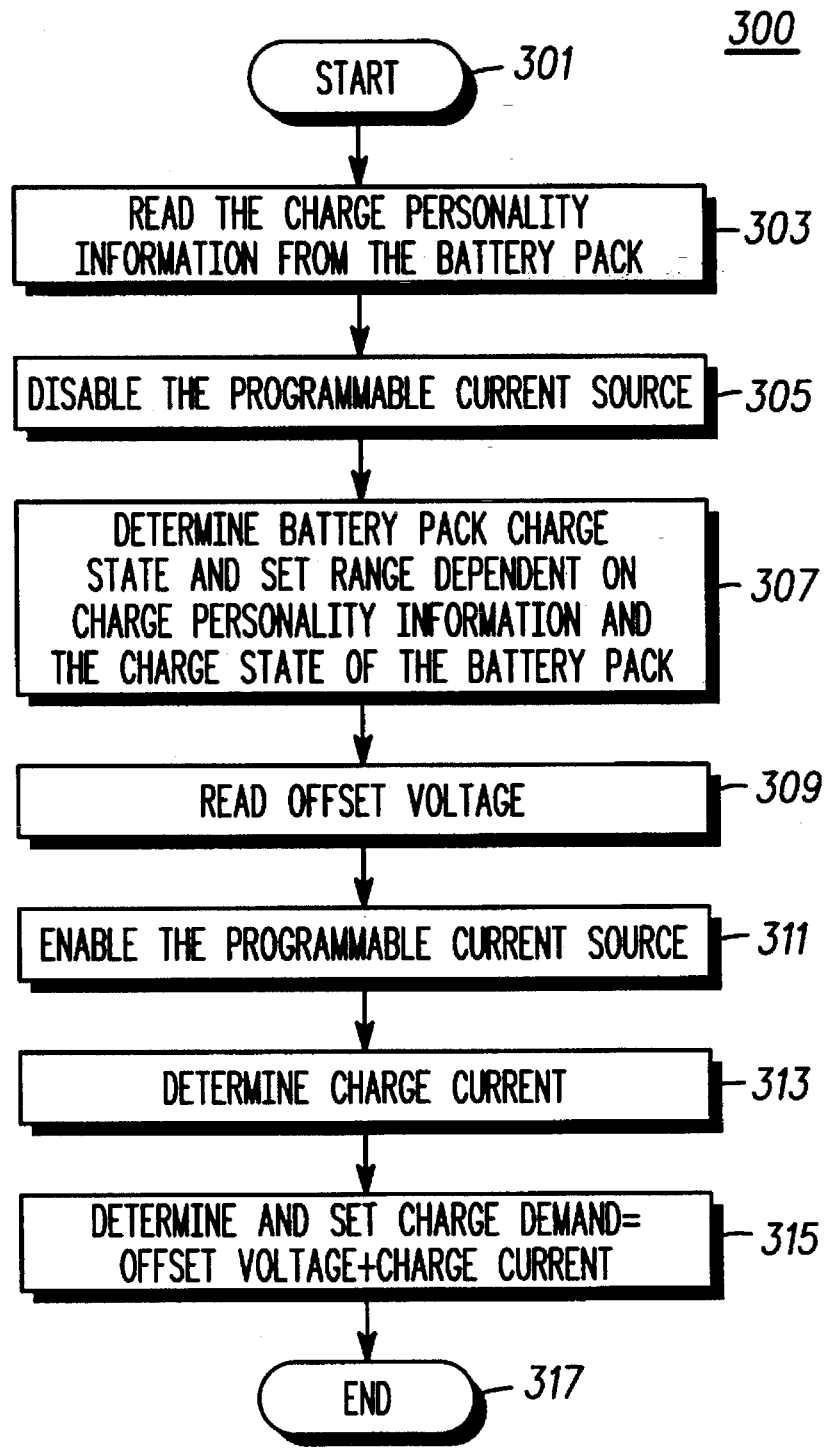
FIG. 3 is a flow chart illustrating various method steps associated with an operating method, including an auto-zeroing aspect of the preferred embodiment.

The microcontroller 253 is programmed to execute method steps shown in FIG. 3. In the preferred embodiment a Motorola MC68HC05B6 device is used as the microcontroller 253. Of course, those skilled in the art will recognize other, equivalent, microcontrollers that will perform equally well in this application. The microcontroller 253 is coupled to a battery pack 107'. The battery pack 107' is comprised of the rechargeable battery 217 and a memory device 219 for storing a charge personality. The battery pack's 107' charge personality is used to store various ideal charge conditions for the particular rechargeable battery 217 positioned in the battery pack 107'. The charge personality 219 is normally dependent on the rechargeable battery's 217 characterizes such as chemistry, capacity, and the number of cells in the rechargeable battery 217. The optimal charge algorithms are also stored in the memory of the charge personality 219.

The microcontroller 253 also has an analog-to-digital converter input 251. This input 251 is used to input the scaled charge current signal 111'. When the programmable current source 101' is turned off, the voltage read by this analog-to-digital converter input 251 is the offset voltage of the circuit. Its operation will be discussed in the section of auto zero circuit. This input 251 can also be used for diagnostic purposes. Since the voltage level of the scaled charge current signal 111' is directly proportional to the charge current 105', and the microcontroller 253 can determine the offset voltage of the circuit, then by interpreting the voltage level of this charge current signal 111', the microcontroller 253 can determine if the charge current 105' is within specification. If desirable, a warning signal can be generated if a fault is detected. The microcontroller 253 also provides the current range signal 113' to set the gain of the scaler 109'. This current range signal 113' is selected, depending on the method detailed later in FIG. 3. Also, the microcontroller 253 has an output 233 for driving a transistor 235. This transistor 235 provides the microcontroller 253 the capability to turn off, or disable, the programmable current source 101'. The microcontroller needs to turn off the programmable current source 101' when charging is completed, or during the process of auto-zeroing described later. First, a working example of the system will be detailed.

As described in the Background section, in a typical battery charger system, it is advantageous to charge a rechargeable battery at different rates. In the preferred embodiment, the battery pack 107' will be charged by the system 200 shown, at different rates as required by the battery pack 107' using two current ranges.

Initially, when the battery pack 107' is in a discharged state, the system 200 must provide a relatively high charge current 105' to fast charge the battery pack 107'. To effect this, the microcontroller 253 fetches the above-mentioned charge personality information, which is embedded in the memory device 219 from the battery pack 107'. As mentioned above the personality information includes the battery chemistry, the battery capacity, and the charging algorithm for each battery type as discussed previously. The microcontroller 253 fetches the information over a serial interface 221. Here the serial interface 221 includes a data line and a clock line for fetching the data associated with the battery's 217 charge personality. The details of this interface are not crucial and therefore are not detailed further here.

As mentioned earlier, FIG. 3 is a flow chart illustrating various method steps associated with an operating method, including an auto-zeroing aspect of the preferred embodiment.

This method, represents a software module 300 executing within the microcontroller 253. This module 300 may either run continuously, or alternatively be executed when desirable, based on the specific application. It's important to note that to achieve very accurate current control—especially at low currents, certain systematic errors—such as offset voltage associated with the system 200, must be accounted for. An example of this will be shown in the module 300.

Initially, when the system is powered-on, the microcontroller 253 will call the module 300 starting a step 301.

Next, at step 303, the microcontroller 253 fetches the charge personality information embedded within in the memory device 219 of the battery pack 107'.

Next, in step 305, the microcontroller 253 determines a charge state, or condition of the rechargeable battery 217 and sets the current range signal dependent on the charge personality and the charge state of the rechargeable battery 217. Typically, the determination of charge state is accomplished by measuring an initial voltage across and temperature within the rechargeable battery 217. Although not specifically shown here there are many well known techniques for determining the voltage and temperature associated with the rechargeable battery 217. Based on the measured voltage and temperature, and dependent on the charge personality information determined in step 305, the current range signal 113', or coarse current setting is set to select the high range, or low range, of current control. For instance, if the voltage is high enough to indicate that the battery is charged, or the temperature is too high to warrant more charging—then the state of the current range signal 113' is not crucial because current will not be provided to the rechargeable battery 217. Similarly, if the voltage is low and the temperature is low, indicating that the battery 217 is substantially depleted, then the high range may be selected. Conversely, if the voltage, and/or temperature indicate that the rechargeable battery 217 needs a top-off or trickle charge rate, then the low range will be selected. If the high range is required, then the microcontroller 253 sets the current range signal 113' to a logical "one" level—thus turning on the FET 223 and placing the resistor 225 in parallel with the resistor 241 and the scaler will provide a scaled charge current signal 111'. Likewise, if a low range of charge current 105' is required, the current range signal 113' will be set to a logical "zero" level, and the FET 223 will be off—thus the resistor 225 will not be in parallel with the resistor 241 and the scaler will provide an unscaled charge current signal 111'.

Next, in step 307, the auto-zeroing process commences. First, the programmable current source 101' is disabled. This is accomplished by setting the output 233 to a logical "one" level to ensure the programmable current source 101' is off, via transistor 235.

Then, in step 309, an offset voltage associated with the system 200 is determined. Since the programmable current source 101' is turned off, the only charge current 105' flowing is that provided by resistor 201 which has a relatively high resistance. Therefore, this current is very small compared with a normal level of charging current. This small charge current 105' biases the voltage level at an anode of a diode 215 to a diode drop higher than the voltage of the rechargeable battery 217. The diode 215 is used to block current flow from the rechargeable battery 217 during this auto-zeroing operation. As discussed previously, a voltage will consequently develop at the analog-to-digital converter input 251 of the microcontroller 253. This voltage represents the offset voltage of the scaler 109'. The microcontroller 253 then reads this voltage thus has determined the offset error associated with the auto-zeroing operation.

Next, in step 311, the programmable current source 101' is re-enabled. To effect this the microcontroller 253 sets the on-off output 233 to a logical "zero", which releases transistor 235's control of the programmable current source 101'.

In step 313 a charge current is determined. This charge current is the current that the battery pack 107' will be charged at. Based on the charge personality information 219, and the initial charge condition, here based on an initial battery voltage and temperature readings, the microcontroller 253 determines a desirable amplitude of charge current 105'.

Then, in step 315 a charge current demand signal 227 is determined. This charge current demand signal 227, will represent the earlier-mentioned fine current adjustment and will take the form of a PWM signal as mentioned above. The microcontroller 253 can determine the required PWM cycle representing the desirable amplitude of charge current 105'. It can also determine the equivalent PWM cycle representing the measured offset voltage. A sum of these two PWM percentage cycles represents the real demand for the desired charge current 105'. As a result the microcontroller 253 will output an appropriate PWM signal 227.

Then, the module 300 will be exited in step 317. Typically, it may be advantageous to continuously repeat the process 300, in case the microcontroller 253 detects a significant change in temperature or battery voltage associated with the rechargeable battery 217.

In conclusion, an improved variable charge rate battery charger apparatus and method with multiple range current control has been detailed above. In particular, this device has the capability to provide charge current that is more accurate and has a higher resolution of control over multiple current ranges. Specifically, regardless of the current range selected, the voltage level of the scaled charge current signal 111' will be forced to be the same as the voltage level 252 representative of the charge current demand signal 227. That multiple ranges conform to the same voltage level not only improves the accuracy of the current control for the lower range, it also provides optimal resolution for the current control.

The offset voltage of the system 200 is always corrected at the battery voltage, and can optionally be corrected as battery voltage or temperature changes, thus providing better current control accuracy. Also, the use of a PWM output from the microcontroller 253 to control the charge current 105' provides for a minimal component count. Additionally, the use of resistor 213 allows the circuit offset always to be positive, and therefore easily correctable. Further, the wide dynamic control range and the flexibility of preprogrammed charge personality allows the system 200 to work with various type of batteries.

What is claimed is:

1. A battery charger apparatus with multiple range current control comprising:

programmable current source means coupled to and for providing a charge current to charge a battery, wherein the charge current is dependent on a charge demand signal provided to said programmable current source means;

scaler means coupled to said programmable current source means for providing a scaled charge current signal dependent on the charge current and a current range signal; and charge current control means for regulating the charge current by providing the charge demand signal to said programmable current source means, wherein the charge demand signal is dependent on the scaled charge current signal, and wherein more than one amplitude of the charge current is provided to said battery, dependent on more than one current range signal provided by said charge current control means to said scaler means.

2. An apparatus in accordance with claim 1 wherein said programmable current source means, said scaler means, and said charge current control means maintain a constant amplitude of the scaled charge current signal responsive to the more than one current range signal.

3. An apparatus in accordance with claim 1 wherein the charge control means comprises means for determining a charge personality from said battery and providing the more than one amplitude charge current to charge said battery dependent on the determined charge personality.

4. An apparatus in accordance with claim 1 wherein the charge control means comprises means for determining a charge condition from said battery and providing the more than one amplitude charge current to charge said battery dependent on the determined charge condition.

5. All apparatus in accordance with claim 4 wherein the charge control means comprises means for determining a charge personality from said battery and providing the more than one amplitude charge current to charge said battery dependent on the determined charge personality and the determined charge condition.

6. A battery charger apparatus with multiple range current control comprising:

a programmable current source having an output coupled to and for providing a charge current to charge a battery, wherein the charge current is dependent on a charge demand signal provided to a control input of said programmable current source;

a scaler coupled to the output of said programmable current source for providing a scaled charge current signal dependent on the charge current and a current range signal; and a charge current control unit for regulating the charge current by providing the charge demand signal to the control input of said programmable current source, wherein the charge demand signal is dependent on the scaled charge current signal, and wherein more than one amplitude of the charge current is provided to said battery, dependent on more than one current range signal provided by said charge current control unit to said scaler.

7. An apparatus in accordance with claim 6 wherein said programmable current source, said scaler, and said charge current control unit maintain a constant amplitude of the scaled charge current signal responsive to the more than one current range signal.

8. An apparatus in accordance with claim 7 wherein the charge control unit comprises means for determining a charge personality from said battery and providing the more than one amplitude charge current to charge said battery dependent on the determined charge personality.

9. An apparatus in accordance with claim 7 wherein the charge control unit comprises means for determining a charge condition from said battery and providing the more than one amplitude charge current to charge said battery dependent on the determined charge condition.

10. An apparatus in accordance with claim 9 wherein the charge control unit comprises means for determining a charge personality from said battery and providing the more than one amplitude charge current to charge said battery dependent on the determined charge personality and the determined charge condition.

11. An apparatus in accordance with claim 7 further comprising means for determining an offset voltage associated with said scaler and for providing the charge demand signal to the control input of said programmable current source, dependent on the determined offset voltage.

12. A method of charging a battery with multiple range current control, said method comprising the steps of:

providing a charge current to charge a battery dependent on a charge demand signal provided to a programmable current source;

providing a scaled charge current signal dependent on the charge current and a current range signal; and regulating the charge current by providing the charge demand signal to the programmable current source, wherein the charge demand signal is dependent on the scaled charge current signal, and wherein more than one amplitude of the charge current is provided to the battery, dependent on more than one current range signal provided by the charge current control unit to the scaler.

13. A method in accordance with claim 12 further comprising a step of maintaining a constant amplitude of the scaled charge current signal responsive to the more than one current range signal.

14. A method in accordance with claim 12 further comprising a step of determining a charge personality from said battery and providing the more than one amplitude charge current to charge said battery dependent on the determined charge personality.

15. A method in accordance with claim 12 further comprising a step of determining a charge condition from said battery and providing the more than one amplitude charge current to charge said battery dependent on the determined charge condition.

16. A method in accordance with claim 13 further comprising a step of determining a charge personality from said battery and providing the more than one amplitude charge current to charge said battery dependent on the determined charge personality and the determined charge condition.

* * * * *